US012679905B2

(12) United States Patent
You et al.

(10) Patent No.: US 12,679,905 B2
(45) Date of Patent: Jul. 14, 2026

(54) CHITOSAN OLIGOSACCHARIDE SULFATE AND PREPARATION METHOD THEREOF

(71) Applicant: Jiangxi Normal University, Nanchang (CN)

(72) Inventors: Qinghui You, Nanchang (CN); Manying Wang, Nanchang (CN)

(73) Assignee: Jiangxi Normal University, Nanchang (CN)

( * ) Notice: Subject to any disclaimer, the term of this patent is extended or adjusted under 35 U.S.C. 154(b) by 0 days.

(21) Appl. No.: 18/861,849

(22) PCT Filed: Aug. 15, 2024

(86) PCT No.: PCT/CN2024/112456
§ 371 (c)(1),
(2) Date: Oct. 30, 2024

(87) PCT Pub. No.: WO2025/036462
PCT Pub. Date: Feb. 20, 2025

(65) Prior Publication Data
US 2026/0152579 A1 Jun. 4, 2026

(30) Foreign Application Priority Data
Aug. 17, 2023 (CN) .......................... 202311038899.1

(51) Int. Cl.
*C08B 37/08* (2006.01)
(52) U.S. Cl.
CPC .................................. *C08B 37/003* (2013.01)
(58) Field of Classification Search
CPC .................................................... C08B 37/003
See application file for complete search history.

(56) References Cited

FOREIGN PATENT DOCUMENTS

| | | | |
|---|---|---|---|
| CN | 1908019 | A | 2/2007 |
| CN | 104170833 | A | 12/2014 |
| CN | 107648603 | A | 2/2018 |
| CN | 109134552 | A | 1/2019 |
| CN | 115838995 | A | * 3/2023 |
| CN | 117229429 | | 12/2023 |
| JP | 2008101079 | A | 5/2008 |

OTHER PUBLICATIONS

Qin, Cai-qin. CN-1908019-A. 2007. English Translation. (Year: 2007).*
Zhu, Yun-bin. CN-115838995-A. 2023. English Translation. (Year: 2023).*
ISR of PCT/CN2024/112456.
CNIPA, Notification to grant patent right for Chinese application CN202311038899.1, Feb. 9, 2024.

* cited by examiner

*Primary Examiner* — Andrea Olson
*Assistant Examiner* — Samuel L Galster
(74) *Attorney, Agent, or Firm* — Hemisphere Law, PLLC

(57) ABSTRACT

The present disclosure belongs to the field for preparation of chitosan oligosaccharide, and particularly relates to a chitosan oligosaccharide sulfate and a preparation method thereof. The method is as follows: adding an equal volume of 1.0%-2.0% by mass of potassium sulfate solution into 2.0%-4.0% by mass of chitosan oligosaccharide hydrochloride solution and evenly mixing to obtain a mixed solution, allowing a molar ratio of amino to sulfate ions in the mixed solution to be 2:1, then adding absolute ethyl alcohol to obtain a chitosan oligosaccharide sulfate suspension, standing, filtering, collecting precipitates, washing, drying and smashing to finally obtain the chitosan oligosaccharide sulfate. This method cleverly utilizes a characteristic that the chitosan oligosaccharide sulfate is difficultly dissolved into 75% ethyl alcohol aqueous solution, while potassium chloride is slightly dissolved into 75% ethyl alcohol aqueous solution, the chitosan oligosaccharide sulfate is obtained using a precipitation method. Moreover, the preparation method used in the present disclosure is simple to operate, economic and environmental-friendly, does not need the use of highly corrosive sulfuric acid, and is friendly to operation staffs, environments and production equipment.

8 Claims, No Drawings

CHITOSAN OLIGOSACCHARIDE SULFATE AND PREPARATION METHOD THEREOF

TECHNICAL FIELD

The present disclosure belongs to the field for the preparation of chitosan oligosaccharide, and particularly relates to a chitosan oligosaccharide sulfate and a preparation method thereof.

BACKGROUND

Chitosan oligosaccharide is a unique positively charged cationic alkaline amino oligosaccharide in nature. Chitosan oligosaccharide is a small-molecule oligosaccharide with animo generated by partial hydrolysis of chitosan, which is a sugar chain with a polymerization degree of 2-10. Chitosan oligosaccharide has wide application in the field of biological medicines, can be used as a nutritional source of probiotics, and also possesses antibacterial activity, antioxidant activity and other biological activities.

The Chinese Patent "Chitosan oligosaccharide sulfate and preparation method thereof" (patent number: ZL200610020011.1) provides a preparation method of a chitosan oligosaccharide sulfate. In this method, chitosan is added into a weak organic acid solution for dissolution and enzymolysis to obtain chitosan oligosaccharide with a polymerization degree of 2-30, the obtained chitosan oligosaccharide is added with sulfuric acid and then settled and washed with an organic solvent to obtain the chitosan oligosaccharide sulfate. In this patent, a highly corrosive raw material such as sulfuric acid needs to be used, which is extremely not friendly to operation staffs, environments and production equipment. Therefore, it is extremely necessary to develop a new method for preparing the chitosan oligosaccharide sulfate.

SUMMARY

The objective of the present disclosure is to provide a chitosan oligosaccharide sulfate and a preparation method thereof in order to solve the defects in the prior art. The following technical solution will be specifically adopted.

In the first aspect of the present disclosure, provided is a preparation method of a chitosan oligosaccharide sulfate, comprising the following steps:

adding an equal volume of 1.0%-2.0% by mass of potassium sulfate solution into 2.0%-4.0% by mass of chitosan oligosaccharide hydrochloride solution and evenly mixing to obtain a mixed solution, allowing a molar ratio of amino to sulfate ions in the mixed solution to be 2:1, then adding absolute ethyl alcohol to obtain a chitosan oligosaccharide sulfate suspension, standing, filtering, collecting precipitates, washing, drying and smashing to finally obtain the chitosan oligosaccharide sulfate.

The inventor of the present disclosure provides the preparation method of the chitosan oligosaccharide sulfate. By rationally setting the molar ratio of amino in the chitosan oligosaccharide hydrochloride to sulfate ions in potassium sulfate, the amino with one positive charge on chitosan oligosaccharide is matched with the sulfate ions with two negative charges in 2:1, a chitosan oligosaccharide sulfate precipitate is formed in 75% ethyl alcohol aqueous solution system, while low concentrations of chlorine ions and potassium ions are dissolved into 75% ethyl alcohol aqueous solution, thereby maintaining the ion state and forming no precipitates. Therefore, in the present disclosure, the chitosan oligosaccharide sulfate can be prepared by a precipitation method, while the precipitate is washed with 75% ethyl alcohol aqueous solution, so as to remove a small amount of potassium chloride attached to the surface of the precipitate to improve the purity of the chitosan oligosaccharide sulfate. This preparation method is simple to operate and low in risk, the used potassium sulfate is cheap in price, safe and easily available, is more suitable for large-scale use in industrial production compared with sulfuric acid, avoids the defects that the existing technology needs to use highly corrosive raw materials such as sulfuric acid, which is not friendly to operation staffs, environments and production equipment.

In the present disclosure, the reasons why chitosan oligosaccharide hydrochloride is used rather than various chitosan oligosaccharide organic acid salts are that various organic acid contain carbonyl which is prone to a Maillard reaction between carbonyl and amino of chitosan oligosaccharide: other chitosan oligosaccharide inorganic acid salts are not selected because in the chitosan oligosaccharide inorganic acid salts on the market, there is only one chitosan oligosaccharide hydrochloride except a target product chitosan oligosaccharide sulfate. In fact, chitosan oligosaccharide is formed by hydrolysis of chitosan, while chitosan is difficultly dissolved in water and hydrolyzed in the presence of enzymes or chemical catalysts only when being dissolved in organic acids or hydrochloric acid. Salts (including chitosan sulfate) formed by chitosan and inorganic acids with bivalence and higher bivalence are in general difficultly dissolved in water and cannot serve as a proper hydrolysis substrate, and therefore chitosan oligosaccharide hydrochloride is selected as a raw material: the molar ratio of the amino in chitosan oligosaccharide to sulfate ions in potassium sulfate in the mixed solution is controlled in 2:1, so that ion binding is achieved between sulfate ions and amino in chitosan oligosaccharide to form chitosan oligosaccharide sulfate, and the formed chitosan oligosaccharide sulfate can be sufficiently precipitated in a 75% ethyl alcohol aqueous solution system. If the concentration of chitosan oligosaccharide hydrochloride is too high, chitosan oligosaccharide hydrochloride is mingled in the precipitate, so as to reduce the quality of chitosan oligosaccharide sulfate; if the concentration of chitosan oligosaccharide hydrochloride is too low; chitosan oligosaccharide sulfate cannot be sufficiently precipitated, so as to reduce the yield of chitosan oligosaccharide sulfate; if the concentration of potassium sulfate is too high, redundant potassium sulfate can be mingled in the precipitate, so as to reduce the quality of chitosan oligosaccharide sulfate; if the concentration of potassium sulfate is too low; it is impossible to convert all chitosan oligosaccharide hydrochlorides into chitosan oligosaccharide sulfates, which will result in the inclusion of chitosan oligosaccharide hydrochlorides in the precipitate and reduce the quality of chitosan oligosaccharide sulfates. Therefore, the mass percentage concentration 2.0%-4.0% of the chitosan oligosaccharide hydrochloride solution and the mass percentage concentration 1.0%-2.0% of potassium sulfate solution are both optimal concentrations in this experiment. The concentrations can improve not only the yield of chitosan oligosaccharide sulfate but also the quality of chitosan oligosaccharide sulfate.

In the present disclosure, potassium sulfate is used as a raw material because relative to sulfuric acid as a strong acid, potassium sulfate as a neutral salt has many advantages, including no toxicity, harmlessness, no corrosivity, and no harmful effects on human health and the environment. In addition, the present disclosure uses potassium sulfate rather than sodium sulfate or other neutral salts because after potassium sulfate is mixed with chitosan oligosaccharide hydrochloride and chitosan oligosaccharide hydrochloride is precipitated by 75% ethyl alcohol aqueous solution, a small amount of water contained in the ethyl alcohol solution can be used as a solvent ionization solute, the solubility of potassium chloride is larger than that of sodium chloride, and therefore a process that chitosan oligosaccharide sulfate in 75% ethyl alcohol aqueous solution is sufficiently precipitated and potassium chloride is fully dissolved can be achieved by controlling the concentration of the chitosan oligosaccharide hydrochloride solution, the concentration of the potassium sulfate solution and their ratios. If potassium sulfate is replaced with sodium sulfate, sodium chloride in 75% ethyl alcohol aqueous solution is relatively low in solubility, so as to difficultly achieve effective separation of chitosan oligosaccharide sulfate from sodium chloride; in other neutral sulfates, the solubility of calcium sulfate and barium sulfate is too low; ferrous sulfate and ammonium sulfate are irritating, copper sulfate, potassium aluminum sulfate and aluminum sulfate are toxic, and therefore they are all not suitable for use.

As a further preferred embodiment, the above chitosan oligosaccharide hydrochloride has a polymerization degree of 2-3, which is lower than the polymerization degree of 2-30 in the prior art, and higher active components proportions. Many physiological and biochemical activities of chitosan oligosaccharide are closely related to polymerization degree distribution of chitosan oligosaccharide, for example, in terms of immunity enhancement, chitosan oligosaccharide with a polymerization degree of 6-8 (or 4-7, and 5-7) has good antibacterial activity, enhanced immunity and good anti-tumor activity, wherein chitosan oligosaccharide shows higher anti-tumor activity: in terms of plant disease resistance induction, chitosan oligosaccharide with a polymerization degree 4-6 can regulate and control the generation of plant *rhizobia*.

As a further preferred embodiment, the molecular weight of the above chitosan oligosaccharide hydrochloride is less than or equal to 2000 Da. The molecular weight of less than or equal to 2000 Da indicates higher proportion of active components. In terms of blood sugar regulation, chitosan oligosaccharide with a molecular weight of around 1700 Da is suitable for patients with hyperlipidemia, which can reduce the level of blood sugar and improve antioxidant capacity so as to take a health-care effect: in terms of antibacterial function, chitosan oligosaccharide with an average molecular weight of 610 Da has a certain antibacterial effect on raw milk and can obviously inhibit the post acidification effect of yogurt.

As a further preferred embodiment, a volume ratio of the above absolute ethyl alcohol to the above mixed solution is 3:1. When the volume ratio of the absolute ethyl alcohol to the mixed solution is 3:1, the concentration of the ethyl alcohol aqueous solution is 75%, which is exactly the most effective disinfection concentration of ethyl alcohol, and can prevent the pollution and propagation of microorganisms in the process of standing and precipitating chitosan oligosaccharide hydrochloride for a long time, so as to improve the quality of the product.

As a further preferred embodiment, the duration for the above standing is 10 h.

As a further preferred embodiment, the above washing is that the collected precipitate is washed three times with a solvent. The solvent is 75% ethyl alcohol aqueous solution. The duration for each washing is 10 min. Washing the precipitate with 75% ethyl alcohol aqueous solution can remove a small amount of potassium chloride attached to the surface of the precipitate and improve the purity of chitosan oligosaccharide sulfate: a silver acetate solution is added into a washing solution after washing is ended each time, until white precipitates are not generated in the washing solution any more, indicating that the washing solution does not contain chlorine ions, and the precipitates have been washed.

As a further preferred embodiment, the temperature of the above drying is 50-60° C. If the temperature is too high, a Maillard reaction easily occurs between the amino of chitosan oligosaccharide and an aldehyde group at the reduction end of chitosan oligosaccharide, so as to reduce the quality of the product; if the temperature is too low; the product is difficult to effectively dry.

Another aspect of the present disclosure also provides the chitosan oligosaccharide hydrochloride obtained by the above preparation method. The chitosan oligosaccharide hydrochloride has a yield of 96% or more, and is a chitosan oligosaccharide product which is non-toxic, non-harmful and good in quality.

The present disclosure has the beneficial effects: the preparation method used in the present disclosure is simple to operate, economic, environmental-friendly, does not need to use highly corrosive sulfuric acid, and is friendly to operation staffs, environments and production equipment. This method cleverly utilizes the characteristic that chitosan oligosaccharide sulfate is difficultly dissolved in 75% ethyl alcohol aqueous solution, while potassium chloride is slightly dissolved in 75% ethyl alcohol aqueous solution. The chitosan oligosaccharide sulfate is obtained by using the precipitation method, avoiding the disadvantage that a highly corrosive raw material such as sulfuric acid needs to be used in the existing technology.

DETAILED DESCRIPTION OF THE EMBODIMENTS

Next, clear and complete description will be made to the concept, specific structure and produced technical effects of the present disclosure in combination with embodiments to sufficiently understand the objective, scheme and effect of the present disclosure. It is noted that without conflict, the embodiments in the present application and features in embodiments can be combined with each other.

Example 1

A preparation method of a chitosan oligosaccharide sulfate specifically comprises the following steps:

Step 1: 10 g of chitosan oligosaccharide hydrochloride was weighed and added into 500 mL of deionized water, and then chitosan oligosaccharide hydrochloride was completely dissolved by stirring to obtain a 2.0% chitosan oligosaccharide hydrochloride solution;

Step 2: 500 mL of 1.0% potassium sulfate solution was weighed and added into the chitosan oligosaccharide hydrochloride solution obtained in step 1 to obtain a mixed solution of chitosan oligosaccharide hydrochloride and potassium sulfate;

Step 3: 3000 mL of absolute ethyl alcohol was added into the mixed solution of chitosan oligosaccharide hydrochloride and potassium sulfate obtained in step 2 to obtain a chitosan oligosaccharide sulfate suspension;

Step 4: the chitosan oligosaccharide sulfate suspension obtained in step 3 was precipitated by standing for 10 h;

Step 5: after standing in step 4 was ended, the product obtained in the above step was filtered to collect precipitate;

Step 6: the precipitate collected in step 5 was washed 3 times with 75% ethyl alcohol aqueous solution so as to remove remaining potassium chloride, wherein the washing duration was 10 min each time, 150 mL of 75% ethyl alcohol aqueous solution was consumed by each washing, a silver acetate solution was added into a washing solution after washing each time was ended so as to find that there were white precipitates in the former two washing solutions and there was no white precipitates in the third washing solution, indicating that the third washing solution did not contain chloride ions, and the precipitate was washed followed by drying at 55° C., and finally crushed to obtain 9.67 g of chitosan oligosaccharide sulfate with a yield of 96.7%.

Example 2

A preparation method of a chitosan oligosaccharide sulfate specifically comprises the following steps:

Step 1: 15 g of chitosan oligosaccharide hydrochloride was weighed and added into 500 mL of deionized water, and then chitosan oligosaccharide hydrochloride was completely dissolved by stirring to obtain a 3.0% chitosan oligosaccharide hydrochloride solution;

Step 2: 500 mL of 1.5% potassium sulfate solution was weighed and added into the chitosan oligosaccharide hydrochloride solution obtained in step 1 to obtain a mixed solution of chitosan oligosaccharide hydrochloride and potassium sulfate;

Step 3: 3000 mL of absolute ethyl alcohol was added into the mixed solution of chitosan oligosaccharide and potassium sulfate obtained in step 2 to obtain a chitosan oligosaccharide sulfate suspension;

Step 4: the chitosan oligosaccharide sulfate suspension obtained in step 3 was precipitated by standing for 10 h;

Step 5: after standing in step 4 was ended, the product obtained in the above step was filtered to collect precipitate;

Step 6: the precipitate collected in step 5 was washed 3 times with 75% ethyl alcohol aqueous solution so as to remove remaining potassium chloride, wherein the washing duration was 10 min each time, 150 mL of 75% ethyl alcohol aqueous solution was consumed by each washing, a silver acetate solution was added into the washing solution after washing each time was ended so as to find that there were white precipitates in the former two washing solutions and there was no white precipitate in the third washing solution, indicating that the third washing solution did not contain chloride ions, and the precipitate was washed followed by drying at 55° C., and finally crushed to obtain 14.62 g of chitosan oligosaccharide sulfate with a yield of 97.5%.

Example 3

A preparation method of a chitosan oligosaccharide sulfate specifically comprises the following steps:

Step 1: 20 g of chitosan oligosaccharide hydrochloride was weighed and added into 500 mL of deionized water, and then chitosan oligosaccharide hydrochloride was completely dissolved by stirring to obtain a 4.0% chitosan oligosaccharide hydrochloride solution;

Step 2: 500 mL of 2.0% potassium sulfate solution was weighed and added into the chitosan oligosaccharide hydrochloride solution obtained in step 1 to obtain a mixed solution of chitosan oligosaccharide hydrochloride and potassium sulfate;

Step 3: 3000 mL of absolute ethyl alcohol was added into the mixed solution of chitosan oligosaccharide and potassium sulfate obtained in step 2 to obtain a chitosan oligosaccharide sulfate suspension;

Step 4: the chitosan oligosaccharide sulfate suspension obtained in step 3 was precipitated by standing for 10 h;

Step 5: after standing in step 4 was ended, the product obtained in the above step was filtered to collect precipitate;

Step 6: the precipitate collected in step 5 was washed 3 times with 75% ethyl alcohol aqueous solution so as to remove remaining potassium chloride, wherein the washing duration was 10 min each time, 150 mL of 75% ethyl alcohol aqueous solution was consumed by each washing, a silver acetate solution was added into the washing solution after washing each time was ended so as to find that there were white precipitates in the former two washing solutions and there was no white precipitate in the third washing solution, indicating that the third washing solution did not contain chloride ions, and the precipitate was washed followed by drying at 55° C., and finally crushed to obtain 19.56 g of chitosan oligosaccharide sulfate with a yield of 97.8%.

Comparative Example 1

A preparation method of a chitosan oligosaccharide sulfate comprises the following steps:

Step 1: 10 g of chitosan oligosaccharide hydrochloride was weighed and added into 500 mL of deionized water, and then chitosan oligosaccharide hydrochloride was completely dissolved by stirring to obtain a 2.0% chitosan oligosaccharide hydrochloride solution;

Step 2: 500 mL of 1.0% sodium sulfate solution was weighed and added into the chitosan oligosaccharide hydrochloride solution obtained in step 1 to obtain a mixed solution of chitosan oligosaccharide hydrochloride and sodium sulfate;

Step 3: 3000 mL of absolute ethyl alcohol was added into the mixed solution of chitosan oligosaccharide hydrochloride and sodium sulfate obtained in step 2 to obtain a chitosan oligosaccharide sulfate suspension;

Step 4: the chitosan oligosaccharide sulfate suspension obtained in step 3 was precipitated by standing for 10 h;

Step 5: after standing in step 4 was ended, the product obtained in the above step was filtered to collect precipitate;

Step 6: the precipitate collected in step 5 was washed 3 times with 75% ethyl alcohol aqueous solution so as to remove remaining sodium chloride, wherein the washing duration was 10 min each time, 150 mL of 75% ethyl alcohol aqueous solution was consumed by each washing, a silver acetate solution was added into the washing solution after washing each time was ended so as to find that there were white precipitates in the three washing solutions, indicating that the three washing solutions all contained chloride ions, the precipitate was not washed, the washing frequency was increased in the later, in such the way, it is found that the eleventh washing solution did not contain chloride ions, and the precipitate was washed followed by drying at 55° C. and finally crushed to obtain 9.08 g of chitosan oligosaccharide sulfate with a yield of 90.8%; compared with example 1 where 10 g of chitosan oligosaccharide hydrochloride was used as a raw material, comparative example 1 has two obvious shortcomings: 1, the washing frequency is significantly increased from 3 to 11, which consumes more duration and reagents: 2, the yield is significantly decreased from 96.7% to 90.8%, and increase in washing frequency causes the loss of the product.

Comparative Example 2

A preparation method of a chitosan oligosaccharide sulfate comprises the following steps:

Step 1: 15 g of chitosan oligosaccharide hydrochloride was weighed and added into 500 mL of deionized water, and then chitosan oligosaccharide hydrochloride was completely dissolved by stirring to obtain a 3.0% chitosan oligosaccharide hydrochloride solution;

Step 2: 500 mL of 1.5% sodium sulfate solution was weighed and added into the chitosan oligosaccharide hydrochloride solution obtained in step 1 to obtain a mixed solution of chitosan oligosaccharide hydrochloride and sodium sulfate;

Step 3: 3000 mL of absolute ethyl alcohol was added into the mixed solution of chitosan oligosaccharide hydrochloride and sodium sulfate obtained in step 2 to obtain a chitosan oligosaccharide sulfate suspension;

Step 4: the chitosan oligosaccharide sulfate suspension obtained in step 3 was precipitated by standing for 10 h;

Step 5: after standing in step 4 was ended, the product obtained in the above step was filtered to collect precipitate;

Step 6: the precipitate collected in step 5 was washed 3 times with 75% ethyl alcohol aqueous solution so as to remove remaining sodium chloride, wherein the washing duration was 10 min each time, 150 mL of 75% ethyl alcohol aqueous solution was consumed by each washing, a silver acetate solution was added into the washing solution after washing each time was ended so as to find that the three washing solutions all contained white precipitates, indicating that the three washing solutions all contained chloride ions, the precipitate was not washed, the washing frequency was increased in the later, in such the way, it was found that the fifteenth washing solution did not contain chloride ions, and the precipitate was washed followed by drying at 55° C., and finally crushed to obtain 13.06 g of chitosan oligosaccharide sulfate with a yield of 87.1%; compared with example 2 where 15 g of chitosan oligosaccharide hydrochloride was used as a raw material, comparative example 2 has two obvious shortcomings: 1, the washing frequency is significantly increased from 3 to 15, which consumes more duration and reagents: 2, the yield is significantly decreased from 97.5% to 87.1%, and increase in washing frequency causes the loss of the product.

Comparative Example 3

A preparation method of a chitosan oligosaccharide sulfate comprises the following steps:

Step 1: 20 g of chitosan oligosaccharide hydrochloride was weighed and added into 500 mL of deionized water, and then chitosan oligosaccharide hydrochloride was completely dissolved by stirring to obtain a 4.0% chitosan oligosaccharide hydrochloride solution;

Step 2: 500 mL of 2.0% sodium sulfate solution was weighed and added into the chitosan oligosaccharide hydrochloride solution obtained in step 1 to obtain a mixed solution of chitosan oligosaccharide hydrochloride and sodium sulfate;

Step 3: 3000 mL of absolute ethyl alcohol was added into the mixed solution of chitosan oligosaccharide hydrochloride and sodium sulfate obtained in step 2 to obtain a chitosan oligosaccharide sulfate suspension;

Step 4: the chitosan oligosaccharide sulfate suspension obtained in step 3 was precipitated by standing for 10 h;

Step 5: after standing in step 4 was ended, the product obtained in the above step was filtered to collect precipitate;

Step 6: the precipitate collected in step 5 was washed 3 times with 75% ethyl alcohol aqueous solution so as to remove remaining sodium chloride, wherein the washing duration was 10 min each time, 150 mL of 75% ethyl alcohol aqueous solution was consumed by each washing, a silver acetate solution was added into the washing solution after washing each time was ended so as to find that the three washing solutions all contained white precipitates, indicating that the three washing solutions all contained chloride ions, the precipitate was not washed, the washing frequency was increased in the later, in such the way, it was found that the nineteenth washing solution did not contain chloride ions, and the precipitate was washed followed by drying at 55° C., and finally crushed to obtain 17.06 g of chitosan oligosaccharide sulfate with a yield of 85.3%; compared with example 3 where 20 g of chitosan oligosaccharide hydrochloride was used as a raw material, comparative example 3 has two obvious shortcomings: 1, the washing frequency is significantly increased from 3 to 19, which consumes more duration and reagents: 2, the yield is significantly decreased from 97.8% to 85.3%, and increase in washing frequency causes the loss of the product.

Obviously, the described embodiments are only some embodiments of the present application, but not all the embodiments. The "embodiment" involved herein means that specific features, structures or characteristics described can be contained in at least one embodiment of the present application. The phrase appearing in various positions in the specification may not necessarily be the same embodiments, nor independent or alternative embodiments that are mutually exclusive with other embodiments. Those skilled in the art can explicitly and implicitly understand that the embodiments described herein can be combined with other embodiments. Based on the embodiments in the present application, other embodiments obtained by persons of ordinary skill in the art without creative efforts are all included within the scope of protection of the present application.

Although the embodiments of the present disclosure have been shown and described, persons of ordinary skill in the art can understand that various changes, modifications, substitutions and variations can be made to these embodiments without departing from the principles and purposes of the present disclosure, and the scope of the present disclosure is limited by the claims and their equivalents.

What is claimed is:

1. A preparation method of a chitosan oligosaccharide sulfate, comprising the following steps: adding an equal volume of 1.0%-2.0% by mass of potassium sulfate solution into 2.0%-4.0% by mass of chitosan oligosaccharide hydrochloride solution and evenly mixing to obtain a mixed solution, allowing a molar ratio of amino to sulfate ions in the mixed solution to be 2:1, then adding absolute ethyl alcohol to obtain a chitosan oligosaccharide sulfate suspension, standing, filtering, collecting precipitates, washing, drying and smashing to finally obtain the chitosan oligosaccharide sulfate; wherein the solvent for washing is a 75% ethyl alcohol aqueous solution.

2. The preparation method according to claim 1, wherein the polymerization degree of the chitosan oligosaccharide hydrochloride is 2-10.

3. The preparation method according to claim 1, wherein the molecular weight of the chitosan oligosaccharide hydrochloride is less than or equal to 2000 Da.

4. The preparation method according to claim 1, wherein a volume ratio of the absolute ethyl alcohol to the mixed solution is 3:1.

5. The preparation method according to claim 1, wherein the duration for standing is 10 h.

6. The preparation method according to claim 1, wherein the washing is that the collected precipitate is washed three times with a solvent.

7. The preparation method according to claim 6, wherein the duration for washing is 10 min/time.

8. The preparation method according to claim 1, wherein the temperature of drying is 50° C.-60° C.

* * * * *